United States Patent
Wardell

(10) Patent No.: US 6,168,355 B1
(45) Date of Patent: Jan. 2, 2001

(54) END-MILL TOOL WITH MULTIPLE CUTTING EDGES

(76) Inventor: Lon J. Wardell, 112 Ivanhoe Dr., Apt. D-1, Saginaw, MI (US) 48603

( * ) Notice: Under 35 U.S.C. 154(b), the term of this patent shall be extended for 0 days.

(21) Appl. No.: 09/309,555

(22) Filed: May 11, 1999

Related U.S. Application Data

(63) Continuation-in-part of application No. 08/798,324, filed on Feb. 10, 1997, now Pat. No. 6,007,276, which is a continuation-in-part of application No. 08/238,864, filed on May 6, 1994, now abandoned.

(51) Int. Cl.$^7$ ................................................ B23B 51/00
(52) U.S. Cl. .......................... 407/54; 407/57; 407/63; 408/230
(58) Field of Search .................. 407/53, 54, 55, 407/56, 57, 58, 63, 113; 408/226, 227, 228, 229, 230

(56) References Cited

U.S. PATENT DOCUMENTS

| | | | |
|---|---|---|---|
| 2,377,329 | * 6/1945 | Dettmer | 407/53 |
| 4,167,363 | * 9/1979 | Whitesel | 408/230 X |
| 4,182,587 | 1/1980 | Striegl | 407/113 |
| 4,187,045 | * 2/1980 | Fischer | 408/230 X |
| 4,222,690 | * 9/1980 | Hosoi | 407/54 X |
| 4,475,850 | 10/1984 | Penoza et al. | 407/54 |
| 4,480,949 | 11/1984 | Van de Bogart | 407/54 |
| 4,497,600 | 2/1985 | Kishimoto | 407/53 |
| 4,610,581 | 9/1986 | Heinlein | 409/132 |
| 4,696,355 | * 9/1987 | Haussmann | 408/230 X |
| 4,721,421 | 1/1988 | Klinger | 407/63 |
| 4,963,059 | 10/1990 | Hiyama | 407/60 |
| 5,049,009 | 9/1991 | Beck et al. | 407/54 |
| 5,193,944 | 3/1993 | Nishimura | 407/53 |
| 5,221,163 | 6/1993 | Nishimura | 407/53 |
| 6,007,276 | * 12/1999 | Wardell | 408/230 X |

* cited by examiner

Primary Examiner—Henry W.H. Tsai
(74) Attorney, Agent, or Firm—Gifford, Krass, Groh, Sprinkle, Anderson & Citkowski, PC

(57) ABSTRACT

The present invention provides an end-mill tool which includes a shank, a point, and a main body portion located intermediate the shank and the point. A first flute is formed on the main body portion along a first helix. A second flute is formed on the main body portion along a second helix. The first and second flutes preferably extend helically along the body of the tool. Two distinct helical cutting surfaces are defined by the first flute and the second flute. The point of the tool includes two additional cutting edges formed by ears extending outward from the point of the tool adjacent the first flute and the second flute.

13 Claims, 2 Drawing Sheets

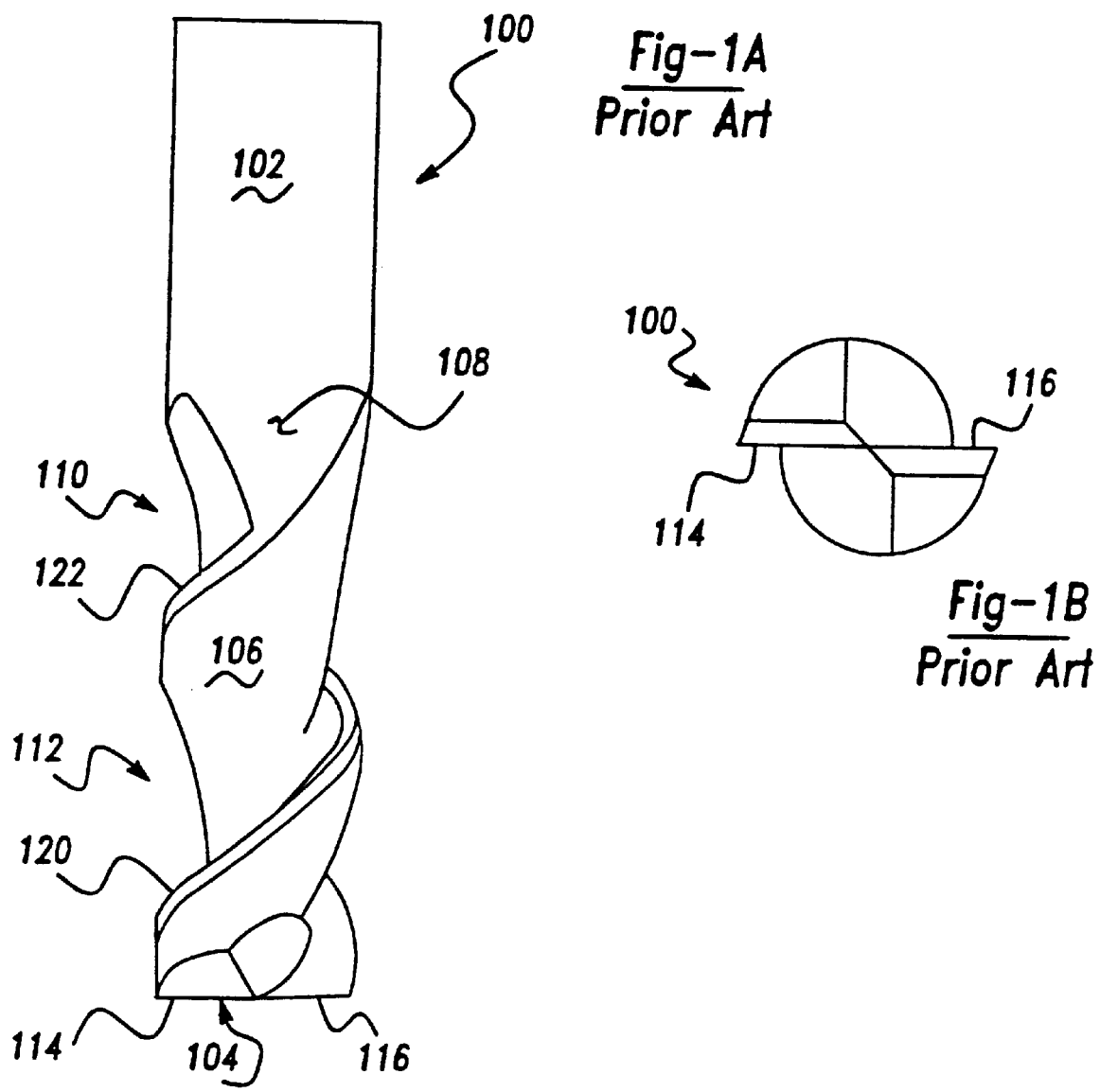

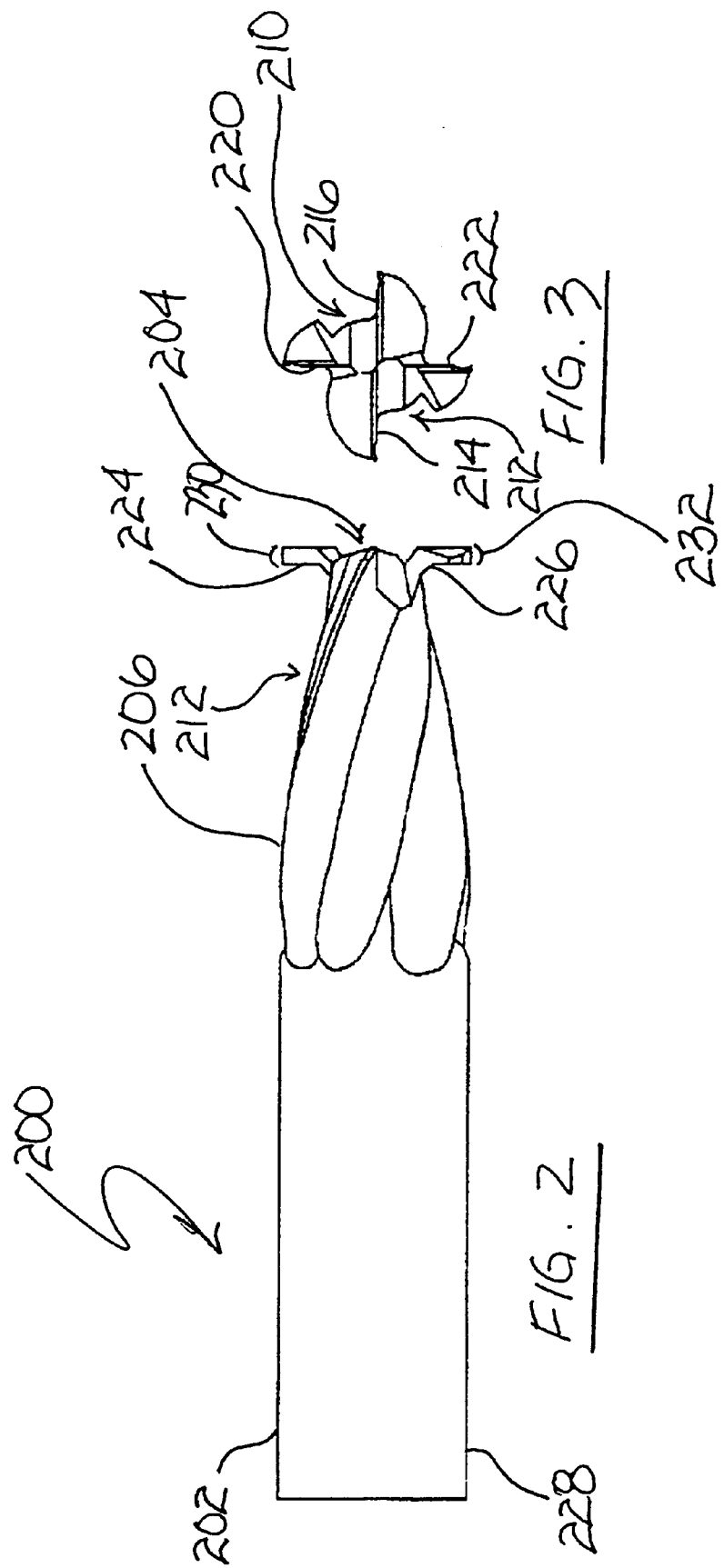

END-MILL TOOL WITH MULTIPLE CUTTING EDGES

CROSS-REFERENCE TO RELATED APPLICATION

This is a continuation in part application of U.S. Ser. No. 08/798,324 filed Feb. 10, 1997, now U.S. Pat. No. 6,007,276 that is a continuation-in-part application of U.S. Ser. No. 08/238,864 filed May 6, 1994, now abandoned.

BACKGROUND OF THE INVENTION

1. Technical Field of the Invention

In general, the present invention relates to machining of a workpiece. More particularly, the present invention relates to end-mill tools for milling a workpiece and a related method.

2. Background of the Invention

Rotary cutting end-mill tools are used for various machining operations on workpieces. Such machine operations are generically referred to as milling operations and include the forming of slots, keyways, pockets, and the like. Several considerations related to end-mill tool design include time for completing a machining operation, amount of material removed in a cut, quality of the cut, and wear on the tool itself during the milling operation.

End-mill tools are formed from materials such as tungsten carbide, high speed steel, ceramic, and other advanced materials and coatings and typically include a "shank" portion, a "body" portion and a "point". The shank portion is located towards one end of the end-mill tool and is generally cylindrical (but may be tapered) for engagement by a spindle of a milling machine. In use, the milling machine rotatably drives the end-mill tool about its longitudinal axis. The body portion of the end-mill tool is located between the shank and the point. The point is formed at an opposite end of the tool from the shank portion, and typically includes one or more cutting edges.

To manufacture an end-mill tool, a grinder is typically used to grind a flute face and a corresponding cutting edge on the body of the end-mill tool. The grind (grinding operation) typically starts from a position adjacent an end of the body portion and continues to a point at or near the interface of the body portion and the shank portion, commonly referred to as a "flute runnout." The grind forms a desired helical flute face and/or helical cutting edge. Prior art end-mills typically have continuous helical flutes with continuous cutting edges helically extending from the inception location to the point (or vice-versa). The flutes function primarily for chip removal, in a manner similar to the helical flutes found on an ordinary drill bit.

An end-mill tool representative of the end-mill tools of the prior art is illustrated in FIGS. 1A and 1B and identified with reference numeral 100. The tool 100 has been formed of cylindrical rod stock which has been ground to form distinctive portions. At one end of the tool 100 is a shank portion 102, suitable for chucking to the spindle of a milling machine (not shown) for rotating and advancing the tool 100. At an other end of the tool 100 is a point 104 which is provided with flat cutting edges 114 and 116. Between the shank portion 102 and the point 104 is a body portion 106 which is helically ground to have a number of flutes 110 and 112. A "boundary" between the body portion 106 and the shank portion 102 is designated 108 in the drawing.

In the embodiment illustrated, the formation of flutes in the body portion 106 generally involves the grinding of two channels, or flutes 110 and 112, which form two diametrically-opposed positions at the point 104 towards the shank portion 102. The grinding is discontinued at the boundary 108 of the body portion 106 and the shank portion 102. It will be appreciated that the direction of the grind could, of course, be reversed. In a known variation referred to as a four-flute end-mill, four flutes wind helically around the body portion of the tool terminating in four cutting edges. The flutes, similar to flutes 110 and 112, are formed at a helix angle which "winds" around the cylindrical body portion.

Generally, the location of the flat cutting edges 114 and 116 is determined by the location of the flutes 110 and 112 at the point 104 of the tool 100. The end-mill tool 100 illustrated in FIG. 1A has two cutting edges 114 and 116 at the point 104. The number and location of the cutting edges 114 and 116 is determined by the flutes 110 and 112. FIG. 1B shows the cutting edges 114 and 116 of the tool 100 in greater detail.

It is known in the art to form flutes at a low helix angle or a high helix angle. A "low helix" (or low helical flute) is a flute that helically "winds" around a cylinder at an angle of no more than 40° (forty degrees). A "high helix" (or high helical flute) is a flute that helically winds around a cylinder at an angle of greater than 40° Low helix angle flutes are typically employed for rough cutting while high helix angle flutes are employed for finish cutting.

Returning to FIG. 1A, the tool 100 is illustrated to include two cutting edges 120 and 122. Each of the cutting edges 120 and 122 is helical and follows one of the flutes 110 and 112 helically around the body portion 106. A notable feature of these cutting edges 120 and 122 is that they are "continuous"—in other words they helically extend continuously from the point 104 to the shank 102. These cutting edges 120 and 122 function to remove material in the linear direction of travel of the end-mill 100 (e.g., from right-to-left, as viewed in FIG. 1A) during a machining operation when the end-mill is "buried"into a workpiece. Material removed from the workpiece will tend to be in the form of an elongated helical (curlicue) chip, and will be guided away from the workpiece by the channels formed by the flutes 110 and 112. In a known variation, four flutes have four cutting edges that wind helically around the body portion in a continuous manner. Material removed from the workpiece will chip and fall away from the piece through the channels formed by the four flutes.

By way of further definition, the edges 114 and 116 at the point 104 of the tool 100 can be considered to be "flat"cutting edges, and the cutting edges 120 and 122 along the body 106 of the tool 100 can be considered to be "helical"cutting edges.

The following U.S. Pat. Nos. are further instructive of the prior art: 4,610,581; 5,049,009; 4,721,421; and 4,963,059. These patents are incorporated by reference as if fully set forth herein.

Numerous variations of the grind (e.g., flute angle) have been attempted for end-mill tool design. Prior advancements relating to material removal and feed rate of end-mill cutters have been accomplished by (1) varying the spiral lead angle; (2) increasing the depth of the flutes in the body portion of the end-mill, (3) changing the radial rake; (4) changing the clearance angles of the cutting edges; and (5) forming chip splitting grooves in the flutes.

While such variations have proven successful in various applications, they are also associated with disadvantages and limitations. For example, such variations may weaken the core diameter of the end-mill cutter, thereby weakening the tool. Additionally, such noted variations are not suitable for a particular applications (e.g., regarding milling time, rough cut, finish cut, etc.). Furthermore, known end-mills are not efficient for both rough cutting and finish cutting.

It is often advantageous when performing an end-mill machining operation to provide a multiplicity of cutting edges at the point of the tool to increase the life of the tool. The corners formed along the outside-diameter of the tool point tend to dull with use. This is so because this is the only area where a 90° angle exists making the corners much weaker than the flat areas along the outside diameter of the tool. Thus, it is a further advantage to provide multiple cutting edges at the point of the tool to reduce the chip load on each corner of the cutting edge. Dull corners at the point of the tool are generally anathema to tools. To the end of reducing wear and increasing longevity of the tool, it is known to use a four fluted tool. However, each additional flute creates additional chips while eliminating chip room, causing chip backing. Generally, the end-mill of the present invention provides for increased tool life and strength without sacrificing chip removal space.

SUMMARY OF THE INVENTION

It is therefore a principal object of the present invention to provide an improved end-mill tool which overcomes the disadvantages and limitations of known constructions, including but not limited to those discussed above.

It is a related object of the present invention to provide an end-mill tool suitable for both roughing and finishing a workpiece.

It is another object of the present invention to provide an end-mill tool which provides for a longer tool life with a higher rate of chip removal.

It is a more specific object of the present invention to provide an end-mill tool which includes two flutes having two helical cutting edges and additional cutting ears located at the point of the tool to provide multiple flat or helical cutting surfaces without additional flutes to prevent chip loading.

Generally according to the present invention, these above noted and other objects are achieved by having two distinct flutes with two cutting edges extending helically around the body of the tool creating a continuous cutting edge. At the point of the tool, two additional typical cutting edges are defined, without accompanying flutes extending the length of the tool, which facilitate a reduction in chip load while simultaneously aiding in chip removal from a workpiece, thereby allowing for a longer tool life.

In one preferred form, the present invention provides an end-mill tool which includes a shank, a point, and a main body portion located intermediate the shank and the point. A first flute is formed on the main body portion along a first helix. A second flute is formed on the main body portion along a second helix. The first and second flutes preferably extend helically along the body of the tool. Two distinct helical cutting surfaces are defined by the first flute and the second flute. The point of the tool includes two additional cutting edges formed by ears extending outward from the point of the tool adjacent the first flute and the second flute.

In a more preferred form, the present invention provides a multiplicity of cutting edges at the point of the tool, preferably four cutting edges on a typical two flute tool. These additional edges allow each corner to do ½ the work. That is, the additional cutting edges reduce the chip load by ½ in the high wear area of the tool. These extra cutting edges are formed at the point of the tool and do not extend along the body of the tool. The edges extend along ears provided adjacent the first and second helical cutting edges. These additional cutting ears provide the tool with four cutting edges and only two flutes, thereby extending the life of the tool while eliminating chip backing experienced with four full flutes.

A continuous cutting edge extends along the helical flute face of both the first and second flutes. Each helical cutting edge typically forms an 85°–90° angle with the point of the tool. The helical cutting edges proceed along the point and are in the same plane but 180° from each other. Two ears extend outwardly from the center of the point of the tool along the same plane but 180° from each other and at an angle to the helical cutting edges of the first and second flutes. Each ear provides a cutting edge and extends downward from the end of the cutting edge at a point equal to the outer diameter of the tool thereby creating a typical 85°–90° angle with the point of the tool. The first and second helical cutting edges with the two additional edges formed by the ears define a plurality of helical cutting surfaces. Each of the compound helical cutting surfaces includes a continuous cutting edge which is operative to remove chips from the workpiece along the two flutes forming the first and second helix.

In another form, the present invention relates to a method for rough cutting and/or finishing a workpiece. The method comprises the step of providing an end-mill tool having a longitudinal axis, a first flute disposed at a first helix angle, and a second flute disposed at a second helix angle. The first and second flutes define a two helical cutting surfaces having a continuous edge extending from the point to the base of the tool. Additionally, the step of providing a first and second ear extending from the point to the outer diameter of the tool provides the third and fourth opposing cutting edges at the point of the tool.

BRIEF DESCRIPTION OF THE DRAWINGS

Further objects, features and advantages of the present invention will become apparent from analysis of the following written specification and accompanying drawings and the appended claims in which:

FIG. 1A is a side view of an end-mill tool, representative of the prior art.

FIG. 1B is an end view of the end-mill tool of FIG. 1A.

FIG. 2 is a side view of an end-mill constructed in accordance with a first preferred embodiment of the present invention, detailing the helical flute face of the end-mill.

FIG. 3 is an end view of the end-mill of the first preferred embodiment of the present invention, from a different perspective than the view of FIG. 2, detailing the cutting edges of the end-mill.

DETAILED DESCRIPTION OF THE PRESENT INVENTION

The present invention will now be described more fully hereinafter with reference to the accompanying drawings in which preferred embodiments are shown. It will be appreciated, however, that the present invention may be embodied in many other forms and should not be construed as limited to the embodiments set forth herein. For purposes of clarity, the same reference numerals are used throughout the drawings to consistently identify identical or equivalent element. In the discussion that follows, it will be understood that no priority of function is meant to be attributed to the terms "first" and "second". In this regard, these terms are used for identification purposes only.

Referring generally to FIGS. 2 through 3 of the drawings, an end-mill tool constructed in accordance with the first preferred embodiment is identified with reference numeral 200. FIG. 2 illustrates a side view of the end-mill 200 of the present invention. FIG. 3 illustrates an end view of the end-mill of FIG. 2.

The end-mill tool 200 is shown to generally include a shank portion 202, a point 204 and a body portion 206. The end-mill has two flutes 210 and 212 (FIGS. 2 and 3) extending from the point towards the shank portion 202. Only one of the flutes 212 is visible in the view of FIG. 2.

The first flute 210 and the second flute 212 are formed at a helix angle extending the length of the body 206 of the end mill 200. At the point 204 of the tool 200, the two flutes 210 and 212 terminate and define a pair of flat cutting edges 214 and 216, commonly referred to as end teeth cutting edges.

Further, in the embodiment illustrated in FIGS. 2 and 3, the end-mill has two additional end teeth cutting edges 220 and 222 which extend from two ears 224 and 226 at an angle 90° from the body 206. The cutting edges 220, 222 are formed without a first or second flute as provided with cutting edges 214 and 216. It will be appreciated by those skilled in the art that the specific number of additional cutting edges 220–222 is largely a matter of design choice and subject to variation. The additional cutting edges 220, 222 originate from grinding off two flutes (not shown) of a four flute tool and leaving the end teeth or cutting edges. The cutting edges 220, 222 extend to the outside diameter 228 of the shank 202 and body 206 of the tool. When the flutes (not shown) are ground down, a length of the outer diameter 228 preferably is left extending downward from the cutting edge 220, 222 to form an ear 230, 232 to support the cutting edges 220, 222. Ears 230, 232 may only extend a minimum length from the cutting edges 220, 222 or they may interfere with the chip flow along flutes 210, 212. In a preferred embodiment, the ears 230, 232 include an extension of the outside diameter 228 equal to approximately 0.100 inches.

With reference to FIG. 3, a side view of the preferred embodiment is there shown having four end teeth cutting edges 214, 216, 220, 222 extending from the point 204 of the end mill 200. Cutting edges 214, 216 are formed from the first and second helical flutes 210, 212, respectively. Cutting edges 214, 216 extend from point 204 in the same plane in opposite directions. Cutting edges 220, 222 are formed from ears 224, 226 and have no helical flutes extending along the body 206 of the end mill 200. Cutting edges 220, 222 extend from point 204 in the same plane in opposite directions and at an angle to cutting edges 214, 216.

The method of forming the tool 200 of the present invention generally includes the following steps:

1. providing a generally cylindrical tool blank (not shown);
2. grinding the first flute 210 at a helix angle into the body portion 206;
3. grinding the second flute 212 at a helix angle into the body portion 206;
4. grinding the first ear 224 at the point 204 of body portion 206 at an angle to the first flute 210;
5. grinding the second ear 226 at the point 204 of the body portion 206 opposite the first ear 224;
6. grinding continuous cutting edges 214, 216 on each of the flutes 210, 212 by grinding corresponding reliefs and clearances at the point 204; and
7. grinding continues cutting edges 220, 222 on each of the opposing ears 224, 226 by grinding corresponding reliefs and clearances at the point 204.

Alternative constructions to the first preferred embodiment of the end-mill 200 of the present invention are anticipated by providing a two flute end mill with ears without having to grind down an original four flute tool.

Various embodiments of an end-mill may be fabricated according to the techniques set forth hereinabove by varying parameters such as helix angles and spacing of a plurality of ears and the like. Further alternative embodiments from the previously-described embodiments principally include length of the ear extending along the outer diameter of the end mill. It will be readily appreciated that the present invention is not limited to any particular number of cutting edges or ears.

The preferred embodiments and alternatives discussed above all assume that the first and second flutes each are formed along right hand helix. In certain applications, it may be desired to incorporate a left hand helix. For example, such an orientation may be desired where downward transfer of removed chips is preferred.

The above, and other objects, features, advantages and embodiments of the invention, including other embodiments of the techniques discussed above may become apparent to one having ordinary skill in the art to which this invention most nearly pertains, and such other and additional embodiments are deemed to be within the spirit and scope of the present invention. For example, the compound helical cutting surfaces which are described as being integrally formed with the tool may alternatively be provided on removable inserts. In certain applications, carbide inserts may be braised to a steel body or alternatively mounted to the steel body with suitable fasteners.

I claim:

1. An end mill for performing a machining operation on a workpiece, the end mill comprising:
    a shank having a central axis;
    a distal end defining an end plane transverse to the axis;
    a main body portion located intermediate the shank and the distal end;
    a first flute formed on the main body portion along a first helix angle, the first flute defining a first helical cutting surface terminating at a first cutting edge lying in the end plane;
    a second flute formed on the main body portion along a second helix angle, the second flute defining a second helical cutting surface terminating at a second end-teeth cutting edge lying in the end plane; and
    at least one ear portion extending outwardly from the main body portion, the ear portion defining a cutting edge also lying in the end plane.

2. The end mill according to claim 1, wherein the main body portion has an outer diameter, and wherein the ear portion extends from the main body portion of said outer diameter by a length L to support the cutting edge of the ear portion.

3. The end mill according to claim 2, wherein the length L of the ear portion is chosen so as not to interfere with the chip flow from each of the flute cutting edges.

4. The end mill according to claim 1, wherein the first and second cutting edges of the first and the second flutes form a continuous line through the axis of the shank.

5. The end mill according to claim 4, wherein the cutting edge of the ear portion extends perpendicularly with respect to the continuous line of the first and second end-teeth cutting edges of the first and the second flutes.

6. The end mill according to claim 4, including a second ear portion extending from the main body portion, defining a second ear cutting edge also lying in the end plane.

7. The end mill according to claim 6, wherein the main body portion has an outer diameter, and wherein the secondary ear extends from the main body portion by a length L to support the cutting edge of the second ear portion.

8. The end mill according to claim 7, wherein the length L of the second ear portion is chosen so as not to interfere with the chip flow from each of the flute cutting edges.

9. The end mill according to claim 6, wherein the second ear cutting edge extends perpendicularly with respect to the continuous line of the first and second cutting edges of the first and the second flutes.

10. A combined roughing and finishing end-mill tool for forming a workpiece by removing chips from the workpiece, the end-mill tool comprising:
- a shank for engaging the end-mill tool with a rotating device for rotating the end-mill tool about a longitudinal axis;
- a distal end defining a plane transverse to the axis;
- a main body portion located intermediate the shank and the distal end;
- a first flute formed on the main body portion along a first helix angle, the first flute defining a first helical cutting surface terminating at a first end-teeth cutting edge in the plane;
- a second flute formed on the main body portion along a second helix angle, the second flute defining a second helical cutting surface terminating at a second end-teeth cutting edge in the plane, the first and second end-teeth cutting edges of the first and the second flutes, forming a continuous line through the axis; and
- a primary ear and a secondary ear, each ear extending from the main body portion and defining respective primary and secondary ear end-teeth cutting edges also lying in the plane at the point, the primary and secondary ear end-teeth cutting edges forming a continuous line.

11. The end mill according to claim 10, wherein the main body portion has an outer diameter, and each ear extends along the main body portion from the outer diameter at a length L to support the end-teeth cutting edge of each ear.

12. The end mill according to claim 11, wherein the length L of each ear is chosen so as not to interfere with the chip removal through the first and the second flutes.

13. The end mill according to claim 10, wherein the ears intersect the continuous line of the end-teeth cutting edges at an angle of 90°.

\* \* \* \* \*

UNITED STATES PATENT AND TRADEMARK OFFICE
CERTIFICATE OF CORRECTION

PATENT NO. : 6,168,355 B1
DATED : January 23, 2001
INVENTOR(S) : Williams et al.

It is certified that error appears in the above-identified patent and that said Letters Patent is hereby corrected as shown below:

<u>Title page,</u>
Item [75] Inventors, please delete "Xiaoyi Min, Plymouth"

<u>Column 21, claim 8,</u>
Line 47, "filament" should read -- filaments --

Signed and Sealed this

Thirteenth Day of November, 2001

Attest:

*Attesting Officer*

NICHOLAS P. GODICI
*Acting Director of the United States Patent and Trademark Office*